United States Patent
Su et al.

(10) Patent No.: US 11,966,551 B2
(45) Date of Patent: Apr. 23, 2024

(54) METAL MESH TOUCH SCREEN AND METHOD FOR MANUFACTURING METAL MESH TOUCH SCREEN

(71) Applicant: Micron Optoelectronics Co., Ltd., Shenzhen (CN)

(72) Inventors: Wei Su, Shenzhen (CN); Guoliang Zhang, Shenzhen (CN); Shourong Hu, Shenzhen (CN)

(73) Assignee: Micron Optoelectronics Co., Ltd., Shenzhen (CN)

( * ) Notice: Subject to any disclaimer, the term of this patent is extended or adjusted under 35 U.S.C. 154(b) by 0 days.

(21) Appl. No.: 17/968,107

(22) Filed: Oct. 18, 2022

(65) Prior Publication Data
US 2023/0214074 A1 Jul. 6, 2023

(30) Foreign Application Priority Data
Dec. 30, 2021 (CN) .......................... 202111680112.2

(51) Int. Cl.
*G06F 3/044* (2006.01)

(52) U.S. Cl.
CPC .......... *G06F 3/0446* (2019.05); *G06F 3/0445* (2019.05); *G06F 2203/04103* (2013.01); *G06F 2203/04112* (2013.01)

(58) Field of Classification Search
CPC ................. G06F 3/0446; G06F 3/0445; G06F 2203/04103; G06F 2203/04112
See application file for complete search history.

(56) References Cited

U.S. PATENT DOCUMENTS

| | | | |
|---|---|---|---|
| 2004/0130536 A1* | 7/2004 | Tanabe | G06F 3/045 345/173 |
| 2016/0202842 A1* | 7/2016 | Uriu | G06F 3/0445 345/175 |
| 2018/0290430 A1* | 10/2018 | Liu | B32B 7/05 |
| 2020/0365784 A1* | 11/2020 | Lee | H01L 33/62 |

FOREIGN PATENT DOCUMENTS

JP   2006-218524 A  *  8/2006
TW     202111509 A  *  3/2021

* cited by examiner

*Primary Examiner* — Md Saiful A Siddiqui
(74) *Attorney, Agent, or Firm* — Westbridge IP LLC

(57) ABSTRACT

Disclosed are a metal mesh touch screen and a method for manufacturing a metal mesh touch screen. The metal mesh touch screen includes the first functional electrode layer, a first adhesive layer, a second functional electrode layer and a second adhesive layer placed sequentially. The first functional electrode layer includes the first metal mesh wiring extending in a first direction and a metal material for preparing the first metal mesh wiring is a metal foil with a first rough surface and a second rough surface. The second functional electrode layer includes a second metal mesh wiring extending in a second direction and a metal material for preparing the second metal mesh wiring is the metal foil with the first rough surface and the second rough surface.

2 Claims, 2 Drawing Sheets selecting a metal foil with a first rough surface and a second rough surface, covering the first rough surface of the metal foil with a polyethylene terephthalate (PET) protective film, attaching a first adhesive layer with a light release film removed to the second rough surface of the metal foil, removing the PET protective film on the first rough surface and coating a photosensitive material on the first rough surface, and exposing, developing, etching and demoulding to obtain a first functional electrode layer with a first metal mesh wiring

selecting the metal foil with a first rough surface and a second rough surface, covering the first rough surface of the metal foil with the PET protective film, attaching a second adhesive layer with a light release film removed to the second rough surface of the metal foil, removing the PET protective film on the first rough surface and coating the photosensitive material on the first rough surface, and exposing, developing, etching and demoulding to obtain a second functional electrode layer with a second metal mesh wiring

blackening the first functional electrode layer and the second functional electrode layer respectively to obtain a targeted first functional electrode layer and a targeted second functional electrode layer

removing a heavy release film of the first adhesive layer and attaching the first adhesive layer to a side of the second functional electrode layer of the targeted second functional electrode layer away from the second adhesive layer to obtain a targeted metal mesh touch screen

METAL MESH TOUCH SCREEN AND METHOD FOR MANUFACTURING METAL MESH TOUCH SCREEN

CROSS-REFERENCE TO RELATED APPLICATIONS

This application claims priority to the Chinese Patent Application No. 202111680112.2, filed on Dec. 30, 2021, the entire contents of which are incorporated herein by reference.

TECHNICAL FIELD

The present disclosure relates to the technical field of touch screen devices, in particular to a metal mesh touch screen and a method for manufacturing a metal mesh touch screen.

BACKGROUND

As capacitive touch screens become more and more powerful in terms of waterproofing, oilproofing, adaptability to high and low temperatures, and can develop from single point to multi-point, the size of capacitive touch screens has also developed from a few inches to tens of inches. The transparent conductive film is a key material in the field of capacitive touch screens. Common conductive film materials mainly include Indium Tin Oxide (ITO), silver nanowire, and metal meshes. The metal meshes are widely used due to their advantages of high light transmittance, small sheet resistance, high resistance to bending, high stability and strong anti-interference ability. The metal mesh is obtained by using the advanced photolithography technology to making the copper metal film into an ultra-fine mesh line, which aims to replace the traditional ITO and act as an XY sensing line. The core material for manufacturing the metal mesh through the photolithography technology is a polymer film covered with a metal layer. At present, the common metal layer is copper, that is, a copper film.

In the related art, in order to obtain extremely fine lines and ultra-low sheet resistance, the thickness of the copper film is usually made into 2 μm to 5 μm, and then a thin layer of 0.5 μm is plated through the advanced vacuum magnetron sputtering method. Further, the thickness is increased by vacuum evaporating or electroplating. Due to the large size requirements of the copper film as raw material for the large-size touch screen, this puts forward higher requirements for the preparation technology of the copper layer, which makes the production cost of continuously using the copper film as raw material relatively high, which is not conducive to the development of large-size metal mesh touch screen technology.

SUMMARY

The present disclosure provides a metal mesh touch screen, which aims to solve the technical problem that the cost of the metal layer as a raw material for traditional metal mesh touch screens is relatively high.

In order to achieve the above objective, the present disclosure provides a metal mesh touch screen. The metal mesh touch screen includes a first functional electrode layer, a first adhesive layer, a second functional electrode layer and a second adhesive layer placed sequentially. The first functional electrode layer includes a first metal mesh wiring extending in a first direction and a metal material for preparing the first metal mesh wiring is a metal foil with a first rough surface and a second rough surface. The second functional electrode layer includes a second metal mesh wiring extending in a second direction and a metal material for preparing the second metal mesh wiring is the metal foil with the first rough surface and the second rough surface. The first direction is located in a first plane, the second direction is located in a second plane, and the first plane intersects with the second plane.

In some embodiments, a thickness of the metal foil is between 2 μm and 20 μm.

In some embodiments, the metal foil is any one of copper foil, silver foil, aluminum foil, iron foil or nickel foil.

In some embodiments, a width of the first metal mesh wiring is between 3 μm and 9 μm; and/or a width of the second metal mesh wiring is between 3 μm and 9 μm.

In some embodiments, the first metal mesh wiring is either hexagonal, rhombic, rectangular or triangular in shape; and/or the second metal mesh wiring is either hexagonal, rhombic, rectangular or triangular in shape.

In some embodiments, the first functional electrode layer includes a first metal layer and a first blackening layer, the first blackening layer is provided on a side of the first metal layer away from the first adhesive layer, and the first metal mesh wiring is provided on the first metal layer; and/or the second functional electrode layer includes a second metal layer and a second blackening layer, the second blackening layer is provided on a side of the second metal layer away from the second adhesive layer, the second metal mesh wiring is provided on the second metal layer, and a side of the second blackening layer away from the second metal layer is connected to a side of the first adhesive layer away from the first metal layer.

In some embodiments, a thickness of the first adhesive layer is between 25 μm and 200 μm; and/or a thickness of the second adhesive layer is between 25 μm and 200 μm.

In some embodiments, a hardness of the first adhesive layer is between 60 HRC and 70 HRC; and/or a hardness of the second adhesive layer is between 60 HRC and 70 HRC.

The present disclosure provides a method for manufacturing a metal mesh touch screen. The method for manufacturing a metal mesh touch screen includes the following operations:

selecting a metal foil with a first rough surface and a second rough surface, covering the first rough surface of the metal foil with a polyethylene terephthalate (PET) protective film, attaching a first adhesive layer with a light release film removed to the second rough surface of the metal foil, removing the PET protective film on the first rough surface and coating a photosensitive material on the first rough surface, and exposing, developing, etching and demoulding to obtain a first functional electrode layer with a first metal mesh wiring;

selecting the metal foil with a first rough surface and a second rough surface, covering the first rough surface of the metal foil with the PET protective film, attaching a second adhesive layer with a light release film removed to the second rough surface of the metal foil, removing the PET protective film on the first rough surface and coating the photosensitive material on the first rough surface, and exposing, developing, etching and demoulding to obtain a second functional electrode layer with a second metal mesh wiring;

blackening the first functional electrode layer and the second functional electrode layer respectively to obtain a targeted first functional electrode layer and a targeted second functional electrode layer; and removing a heavy release film of the first adhesive layer and attaching the first adhesive layer to a side of the second functional electrode layer of the targeted second functional electrode layer away from the second adhesive layer to obtain a targeted metal mesh touch screen.

In some embodiments, the operation of blackening the first functional electrode layer and the second functional electrode layer respectively to obtain the targeted first functional electrode layer and the targeted second functional electrode layer includes:

soaking the first functional electrode layer and the second functional electrode layer 300 in a blackening liquid for blackening;

compositions of the blackening liquid are as follow: selenite is between 0.1% and 2.5%, persulfate is between 1% and 10%, copper ionic solution is between 0.01% and 1%, sodium ionic solution is between 0.01% and 1%, the rest is water.

Compared with the prior art, the present disclosure achieves the following beneficial effects:

The present disclosure provides a metal mesh touch screen. The metal mesh touch screen includes a first functional electrode layer, a first adhesive layer, a second functional electrode layer and a second adhesive layer placed sequentially. The first functional electrode layer includes a first metal mesh wiring extending in a first direction and a metal material for preparing the first metal mesh wiring is a metal foil with a first rough surface and a second rough surface. The second functional electrode layer includes a second metal mesh wiring extending in a second direction and a metal material for preparing the second metal mesh wiring is the metal foil with the first rough surface and the second rough surface. The first direction is located in a first plane, the second direction is located in a second plane, and the first plane intersects with the second plane. In the present disclosure, the metal foil is selected as the raw material for preparing the metal circuit, which can avoid the high-cost of using the metal conductive film with the PET substrate to prepare the metal circuit. In addition, in consideration of the physical properties such as the thickness and the performance of the metal foil, a metal mesh touch screen with two functional electrode layers and two adhesive layers is prepared. The metal mesh touch screen is applied to the large-size touch screen device, which can effectively reduce the unfavorable situation on which the copper film as a high-cost raw material is required to be of high quality and large demand in the preparation of large-size touch screens. Besides, compared with the traditional touch screen, the metal mesh touch screen provided by the present disclosure reduces the use of two layers of PET films, so that the light transmittance of the metal mesh capacitive touch screen without a substrate can be improved and the performance is better.

BRIEF DESCRIPTION OF THE DRAWINGS

In order to more clearly illustrate the technical solutions in the embodiments of the present disclosure or in the related art, drawings used in the embodiments or in the related art will be briefly described below. Obviously, the drawings in the following description are only some embodiments of the present disclosure. It will be apparent to those skilled in the art that other figures can be obtained according to the structures shown in the drawings without creative work.

FIG. 2 is a schematic flowchart of a method for manufacturing a metal mesh touch screen according to some embodiments of the present disclosure.

Figure 1:
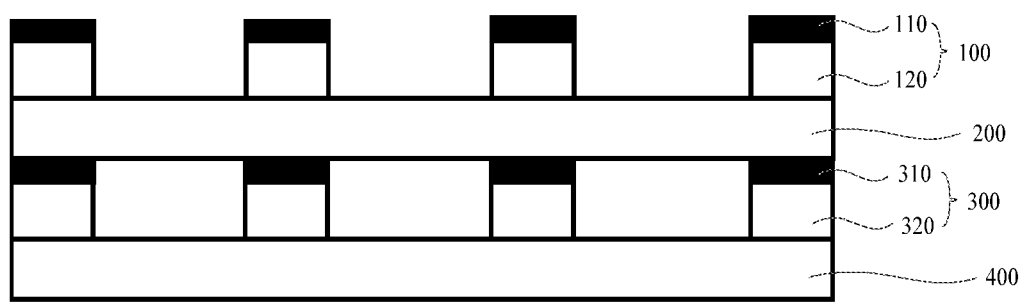
FIG. 1 is a schematic structural view of a metal mesh touch screen according to some embodiments of the present disclosure.

The realization of the objective, functional characteristics, and advantages of the present disclosure are further described with reference to the accompanying drawings.

DETAILED DESCRIPTION OF THE EMBODIMENTS

The technical solutions of embodiments of the present disclosure will be clearly and completely described with reference to the drawings of the present disclosure. Obviously, the described embodiments are only some rather than all of the embodiments of the present disclosure. Based on the embodiments of the present application, all other embodiments obtained by those of ordinary skilled in the art without creative efforts shall fall within the scope of the present disclosure.

It should be noted that all directional indicators (such as up, down, left, right, front, rear, etc.) in the embodiments of the present disclosure are only used to explain the relative positional relationship, movement situation, etc. between components in a specific attitude (as shown in the drawings). If the specific attitude changes, the directional indication also changes accordingly.

In addition, the descriptions related to "first", "second" and the like in the present disclosure are merely for descriptive purposes, and should not be understood as indicating or implying their relative importance or implicitly indicating the number of technical features indicated. Therefore, the feature defined by "first" and "second" may explicitly or implicitly include at least one such feature. Besides, the meaning of "and/or" in the full text includes three parallel solutions. For example, "A and/or B" includes only A, or only B, or both A and B. The various embodiments can be combined with each other, but the combination must be based on what can be achieved by those of ordinary skill in the art. When the combination of the embodiments is contradictory or cannot be achieved, it should be considered that such a combination does not exist, or is not within the scope of the present disclosure.

As shown in FIG. 1, the present disclosure provides a metal mesh touch screen. The metal mesh touch screen includes a first functional electrode layer 100, a first adhesive layer 200, a second functional electrode layer 300 and a second adhesive layer 400 placed sequentially. The first functional electrode layer 100 includes a first metal mesh wiring extending in a first direction and a metal material for preparing the first metal mesh wiring is a metal foil with a first rough surface and a second rough surface. The second functional electrode layer 300 includes a second metal mesh wiring extending in a second direction and a metal material for preparing the second metal mesh wiring is the metal foil with the first rough surface and the second rough surface. The first direction is located in a first plane, the second direction is located in a second plane, and the first plane intersects with the second plane.

In some embodiments, the metal foil is selected as the raw material for preparing metal circuit, which can avoid the high cost of using the metal conductive film with PET substrate to prepare the metal circuit. In addition, in consideration of the physical properties such as the thickness and the performance of the metal foil, a metal mesh touch screen with two functional electrode layers and two adhesive layers is prepared. The metal mesh touch screen is applied to the large-size touch screen device, which can effectively reduce the unfavorable situation on which the copper film as a high-cost raw material is required to be of high quality and large demand in the preparation of large-size touch screens. Besides, compared with the traditional touch screen, the metal mesh touch screen provided by the present disclosure reduces the use of two layers of PET films, so that the light transmittance of the metal mesh capacitive touch screen without substrate can be improved and the performance is better.

For example, but not limited to, the plane in which the first direction is located is perpendicular to the plane in which the second direction is located, such that the projection of the first metal mesh wiring and the projection of the second metal mesh wiring can be perpendicular to each other in the same plane. If the first metal mesh wiring extends in the X direction, then the second metal mesh wiring extends in the Y direction.

In some embodiments, a thickness of the metal foil is between 2 μm and 20 μm.

The thickness of the metal foil is selected so that the metal foil can not only meet the requirements for the photo-etching conditions, but also meet the requirements for the sheet resistance. For example, but not limited to, the thickness of the metal foil can be any one of 3 μm, 6 μm, 9 μm, 12 μm, or 18 μm.

In some embodiments, the metal foil is any one of copper foil, silver foil, aluminum foil, iron foil or nickel foil.

Taking into account the cost, the hardness and the resistance of the metal wiring, the copper foil is selected for the experiment.

In some embodiments, a width of the first metal mesh wiring is between 3 μm and 9 μm; and/or a width of the second metal mesh wiring is between 3 μm and 9 μm.

In order to improve the light transmittance of the metal mesh touch screen, the width of the first metal mesh wiring and the width of the second metal mesh wiring are designed. For example, but not limited to, the width of the first metal mesh wiring is 5 um, and the width of the second metal mesh wiring is 5 μm.

In some embodiments, the first metal mesh wiring is either hexagonal, rhombic, rectangular or triangular in shape; and/or the second metal mesh wiring is either hexagonal, rhombic, rectangular or triangular in shape.

In some embodiments, the first functional electrode layer 100 includes a first metal layer 120 and a first blackening layer 110. The first blackening layer 110 is provided on a side of the first metal layer 120 away from the first adhesive layer 200, and the first metal mesh wiring is provided on the first metal layer 120.

In order to reduce the reflection of the visible light by the first functional electrode layer 100, the first metal layer 120 is subjected to a blackening treatment, and a first blackening layer 110 is formed on the first metal layer 120. Thus the matting treatment of the first metal layer 120 is achieved by the first blackening layer 110. Meanwhile, the first blackening layer 110 can also protect the first metal mesh wiring in the first metal layer 120, which can effectively improve its corrosion resistance.

In some embodiments, the second functional electrode layer 300 includes a second metal layer 320 and a second blackening layer 310. The second blackening layer 310 is provided on a side of the second metal layer 320 away from the second adhesive layer 400, the second metal mesh wiring is provided on the second metal layer 320, and a side of the second blackening layer 310 away from the second metal layer 320 is connected to a side of the first adhesive layer 200 away from the first metal layer 120.

In order to reduce the reflection of the visible light by the second functional electrode layer 300, the second metal layer 320 is subjected to blackening treatment, and a second blackening layer 310 is formed on the second metal layer 320. Thus the matting treatment of the second metal layer 320 is achieved by the second blackening layer 310. Meanwhile, the second blackening layer 310 can also protect the second metal mesh wiring in the second metal layer 320, which can effectively improve its corrosion resistance.

In some embodiments, a thickness of the first adhesive layer 200 is between 25 μm and 200 μm; and/or a thickness of the second adhesive layer 400 is between 25 μm and 200 μm.

The thickness of the adhesive layer is optimized. For example, but not limited to, the first adhesive layer 200 and/or the second adhesive layer 400 is a substrate-free acrylic adhesive (which is an optical clear adhesive (OCA)). The thickness of the OCA can be any of 50 μm, 100 μm, 125 μm, 150 μm, 170 μm or 200 μm. The specific thickness can be selected according to the design of the touch module, and the thickness is not limited here. The optical adhesive has high optical transmittance, which can reach more than 90%.

Optionally, the optical adhesive is acid-free and does not contain acrylic resin with hydroxyl groups, so as to protect the copper lines of the touch screen from corrosion.

In some embodiments, a hardness of the first adhesive layer 200 is between 60 HRC and 70 HRC; and/or a hardness of the second adhesive layer 400 is between 60 HRC and 70 HRC.

Taking into account the supporting effect of the adhesive layer on the functional electrode layer and its tight fit performance, the hardness of the first adhesive layer 200 and/or the second adhesive layer 400 is selected to be between 60 and 70 HRC. In this way, not only the first adhesive layer 200 and the second functional electrode layer 300 can be facilitated to be fully adhered to each other, but also the first adhesive layer 200 can have a certain supporting effect on the first functional electrode layer 100 and the second adhesive layer 400 has a certain supporting effect on the second functional electrode layer 300.

As shown in FIG. 2, the present disclosure further provides a method for manufacturing a metal mesh touch screen, including the following operations:

selecting a metal foil with a first rough surface and a second rough surface, covering the first rough surface of the metal foil with a polyethylene terephthalate (PET) protective film, attaching a first adhesive layer 200 with a light release film removed to the second rough surface of the metal foil, removing the PET protective film on the first rough surface and coating a photosensitive material on the first rough surface, and exposing, developing, etching and demoulding to obtain a first functional electrode layer 100 with a first metal mesh wiring;

selecting the metal foil with a first rough surface and a second rough surface, covering the first rough surface of the metal foil with the PET protective film, attaching a second adhesive layer 400 with a light release film removed to the second rough surface of the metal foil, removing the PET protective film on the first rough surface and coating the photosensitive material on the first rough surface, and exposing, developing, etching and demoulding to obtain a second functional electrode layer 300 with a second metal mesh wiring;

blackening the first functional electrode layer 100 and the second functional electrode layer 300 respectively to obtain a targeted first functional electrode layer 100 and a targeted second functional electrode layer; and removing a heavy release film of the first adhesive layer 200 and attaching the first adhesive layer 200 to a side of the second functional electrode layer 300 of the targeted second functional electrode layer 300 away from the second adhesive layer 400 to obtain a targeted metal mesh touch screen.

In some embodiments, the operation of blackening the first functional electrode layer 100 and the second functional electrode layer 300 respectively to obtain the targeted first functional electrode layer 100 and the targeted second functional electrode layer 300 includes soaking the first functional electrode layer 100 and the second functional electrode layer 300 in a blackening liquid for blackening.

Compositions of the blackening liquid are as follow: selenite is between 0.1% and 2.5%, persulfate is between 1% and 10%, copper ionic solution is between 0.01% and 1%, sodium ionic solution is between 0.01% and 1%, the rest is water.

The functional electrode layers are soaked in a blackening liquid containing selenous acid, stabilizer and inhibitor, so as to realize the blackening treatment of the metal layer by chemical means. Specifically, selenous acid can make the metal layer chemically reactive to generate dark substances, thereby playing a blackening effect. At the same time, the reaction rate is adjusted by the stabilizer, and the blackening speed and blackening depth are suppressed by the inhibitor to guarantee that the blackening liquid only interacts chemically with the surface of the metal layer and prevent the metal layer from being fully reacted resulting in poor electrical properties. In this way, the blackening treatment of the metal layer through the blackening liquid provided by the present disclosure can effectively reduce the reflectivity and brightness of the metal. The reduced reflectivity and brightness of the metal is not visually obvious, and the shadow elimination effect is achieved. In addition, the wiring after blackening is complete and the conductivity of the metal layer has not been affected.

In order to further illustrate the method for manufacturing a metal mesh touch screen provided by the present disclosure and the excellent performance of the metal mesh touch screen prepared by the preparation method, the following embodiments are selected for description. It should be understood that the following embodiments are only used to illustrate the performance of the metal mesh touch screen prepared by the method for manufacturing a metal mesh touch screen provided by the present disclosure, and do not limit the scope of the present disclosure.

Preparing the metal mesh screen without a substrate.

1. Experiment operations: selecting a 12 μm thick electrolytic copper foil with a first rough surface and a second rough surface to prepare the first functional electrode layer and the second functional electrode layer, and selecting a 3M OCA with a thickness of 100 μm to prepare the first adhesive layer and the second adhesive layer.

1.1 The operations of preparing the first functional electrode layer and the second functional electrode layer are as follow:

covering the first rough surface of the 12 μm thick rough electrolytic copper foil with a 100 μm polyethylene terephthalate (PET) protective film. It should be noted that the surface of the copper foil covered with the PET protective film should not have large areas of air bubbles, wrinkles, deformation, indentation and other undesirable phenomena;

then attaching a 125 μm thick 3M OCA to the second rough surface of the 12 μm thick rough electrolytic copper foil by a reprint laminating machine and making an edge positioning mark before lamination;

removing the PET protective film on the first rough surface of the copper foil and covering it with a dry film with a resolution of 12 μm; and then exposing, developing, etching and demoulding the first rough surface covered with the dry film, and finally obtaining a transparent first functional electrode layer and a transparent second functional electrode layer.

1.2 The operations of preparing the metal mesh touch screen are as follow:

removing the heavy release film of OCA in the first adhesive layer of the first electrode layer and completely attaching the first functional electrode layer to the second functional electrode layer to obtain a metal mesh touch screen without a substrate.

The performances of the metal mesh touch screen without a substrate obtained in these embodiments and the metal mesh touch screen prepared by a traditional copper film are shown in Table 1.

Table 1 shows the performance comparison between the metal mesh touch screen without a substrate of the present disclosure and the metal mesh touch screen fabricated by traditional copper film.

TABLE 1

| Performance | Trans-mittance | Thickness of touch screen/μm | Sheet resistance/ (Ω/sq) | 500H high temperature and high humidity test | |
|---|---|---|---|---|---|
| Traditional metal mesh touch screen | 89% | 500 | 0.1 | Exterior OK | Performance OK |
| Metal mesh touch screen in these embodiments | 93% | 280 | 0.06 | Exterior OK | Performance OK |

2. Result analysis:

Referring to Table 1, it can be seen that the metal mesh touch screen of the present disclosure has higher light transmittance and thinner thickness. The exterior and performance after a 500H high temperature and high humidity test can meet the operation requirements. It is indicated that the metal mesh touch screen provided by the present disclosure can solve the raw material problem in preparing the traditional metal mesh touch screen through a copper film.

The above are only some embodiments of the present disclosure, and do not limit the scope of the present disclosure thereto. Under the concept of the present disclosure, equivalent structural transformations made according to the description and drawings of the present disclosure, or direct/indirect application in other related technical fields are included in the scope of the present disclosure.

What is claimed is:

1. A method for manufacturing a metal mesh touch screen, comprising:

selecting a first metal foil with a first rough surface and a second rough surface, covering the first rough surface of the first metal foil with a polyethylene terephthalate (PET) protective film, attaching a first adhesive layer with a light release film removed to the second rough surface of the first metal foil, removing the PET protective film on the first rough surface of the first metal foil and coating a photosensitive material on the first rough surface of the first metal foil, and exposing, developing, etching and demoulding to obtain a first functional electrode layer with a first metal mesh wiring;

selecting a second metal foil with a first rough surface and a second rough surface, covering the first rough surface of the second metal foil with the PET protective film, attaching a second adhesive layer with a light release film removed to the second rough surface of the second metal foil, removing the PET protective film on the first rough surface of the second metal foil and coating the photosensitive material on the first rough surface of the second metal foil, and exposing, developing, etching and demoulding to obtain a second functional electrode layer with a second metal mesh wiring;

blackening the first functional electrode layer and the second functional electrode layer respectively to obtain a targeted first functional electrode layer and a targeted second functional electrode layer; and removing a heavy release film of the first adhesive layer and attaching the first adhesive layer to a side of the second functional electrode layer of the targeted second functional electrode layer away from the second adhesive layer to obtain a targeted metal mesh touch screen.

2. The method of claim 1, wherein the operation of blackening the first functional electrode layer and the second functional electrode layer respectively to obtain the targeted first functional electrode layer and the targeted second functional electrode layer comprises:

soaking the first functional electrode layer and the second functional electrode layer in a blackening liquid for blackening;

wherein compositions of the blackening liquid are as follow: selenite is between 0.1% and 2.5%, persulfate is between 1% and 10%, copper ionic solution is between 0.01% and 1%, sodium ionic solution is between 0.01% and 1%, rest of the compositions of the blackening liquid is water.

\* \* \* \* \*